US011770484B2

(12) United States Patent
Ikuma

(10) Patent No.: US 11,770,484 B2
(45) Date of Patent: Sep. 26, 2023

(54) MULTIFUNCTION DEVICE, CONTROL METHOD OF MULTIFUNCTION DEVICE, AND NON-TRANSITORY COMPUTER-READABLE STORAGE MEDIUM STORING CONTROL PROGRAM

(71) Applicant: SEIKO EPSON CORPORATION, Tokyo (JP)

(72) Inventor: Ken Ikuma, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/664,439

(22) Filed: May 23, 2022

(65) Prior Publication Data

US 2022/0377190 A1 Nov. 24, 2022

(30) Foreign Application Priority Data

May 24, 2021 (JP) ................................ 2021-086728

(51) Int. Cl.
*H04N 1/00* (2006.01)
(52) U.S. Cl.
CPC ..... *H04N 1/00514* (2013.01); *H04N 1/00482* (2013.01); *H04N 2201/0094* (2013.01)

(58) Field of Classification Search
None
See application file for complete search history.

(56) References Cited

U.S. PATENT DOCUMENTS

| 2015/0324675 | A1* | 11/2015 | Morii | ................... | H04N 1/4413 |
| | | | | | 358/1.14 |
| 2017/0010766 | A1* | 1/2017 | Nakashima | ............ | B60K 35/00 |
| 2019/0132459 | A1* | 5/2019 | Kaida | ................ | H04N 1/00424 |

FOREIGN PATENT DOCUMENTS

| JP | 2020-136829 A | 8/2020 |
| JP | 2020-151957 A | 9/2020 |

* cited by examiner

*Primary Examiner* — Frantz Bataille
(74) *Attorney, Agent, or Firm* — Global IP Counselors, LLP

(57) ABSTRACT

An operation panel accepts a selection instruction to select an icon and an edit instruction to edit the icon selected by the selection instruction when an edit screen is displayed, a display control section selects two or more of the icons as a selection icon group when the operation panel accepts the selection instruction for the two or more icons, and the display control section edits the selection icon group when the operation panel accepts the edit instruction for the selection icon group.

10 Claims, 14 Drawing Sheets

MULTIFUNCTION DEVICE, CONTROL METHOD OF MULTIFUNCTION DEVICE, AND NON-TRANSITORY COMPUTER-READABLE STORAGE MEDIUM STORING CONTROL PROGRAM

The present application is based on, and claims priority from JP Application Serial Number 2021-086728, filed May 24, 2021, the disclosure of which is hereby incorporated by reference herein in its entirety.

BACKGROUND

1. Technical Field

The present disclosure relates to a multifunction device, a control method of the multifunction device, and a non-transitory computer-readable storage medium storing a control program.

2. Related Art

In the related art, a multifunction device having a plurality of functions such as a scanning function, a printing function, and a copying function has been known. The multifunction device is provided with an operation panel for instructing various settings and execution of various functions. JP-A-2020-151957 discloses a multifunction device of which an operation panel displays various operation buttons. JP-A-2020-136829 discloses a configuration in which an application icon displayed on an operation panel is hidden according to a user.

Since a multifunction device requires settings for each function, many operation buttons are displayed on the operation panel. In a case where a user of a multifunction device performs an operation as described in JP-A-2020-136829, when there are many operation buttons set to be hidden, the user's work may be troublesome.

SUMMARY

According to an aspect of the present disclosure, there is provided a multifunction device including: a reading unit that reads a document; a printing unit that performs printing on a medium; an operation panel that accepts instructions including an execution instruction and an edit instruction from a user and displays an operation screen including a plurality of icons and an edit screen including the plurality of icons; and a display control section that switches display of the operation panel to the operation screen or the edit screen, in which the operation panel accepts the execution instruction to execute the reading unit or the printing unit when the operation screen is displayed, the operation panel accepts a selection instruction to select the icon and the edit instruction to edit the icon selected by the selection instruction when the edit screen is displayed, the display control section selects two or more of the icons as a selection icon group when the operation panel accepts the selection instruction for the two or more icons, and the display control section edits the selection icon group when the operation panel accepts the edit instruction for the selection icon group.

According to another aspect of the present disclosure, there is provided a control method of a multifunction device including an operation panel that accepts instructions including an execution instruction and an edit instruction from a user and displays an operation screen and an edit screen, a reading unit that reads a document, and a printing unit that performs printing on a medium, the control method including: displaying, on the operation panel, the operation screen including a plurality of icons for accepting the execution instruction to execute the reading unit or the printing unit; displaying, on the operation panel in a switchable manner, from the operation screen to the edit screen that includes the plurality of icons and accepts a selection instruction to select the icon from among the plurality of icons and the edit instruction to edit the icon selected by the selection instruction; selecting two or more of the icons as a selection icon group when the selection instruction is accepted for the two or more icons; and editing the selection icon group when the operation panel accepts the edit instruction for the selection icon group.

According to another aspect of the present disclosure, there is provided a non-transitory computer-readable storage medium storing a control program executed by a processor of a multifunction device including an operation panel that accepts instructions including an execution instruction and an edit instruction from a user and displays an operation screen and an edit screen, a reading unit that reads a document, and a printing unit that performs printing on a medium, the control program causing the processor to execute: displaying, on the operation panel, the operation screen including a plurality of icons for accepting the execution instruction to execute the reading unit or the printing unit; displaying, on the operation panel in a switchable manner, from the operation screen to the edit screen that displays the plurality of icons and accepts a selection instruction to select the icon from among the plurality of icons and the edit instruction to edit the icon selected by the selection instruction; selecting two or more of the icons as a selection icon group when the selection instruction is accepted for the two or more icons; and editing the selection icon group when the operation panel accepts the edit instruction for the selection icon group.

DESCRIPTION OF EXEMPLARY EMBODIMENTS

Figure 1:
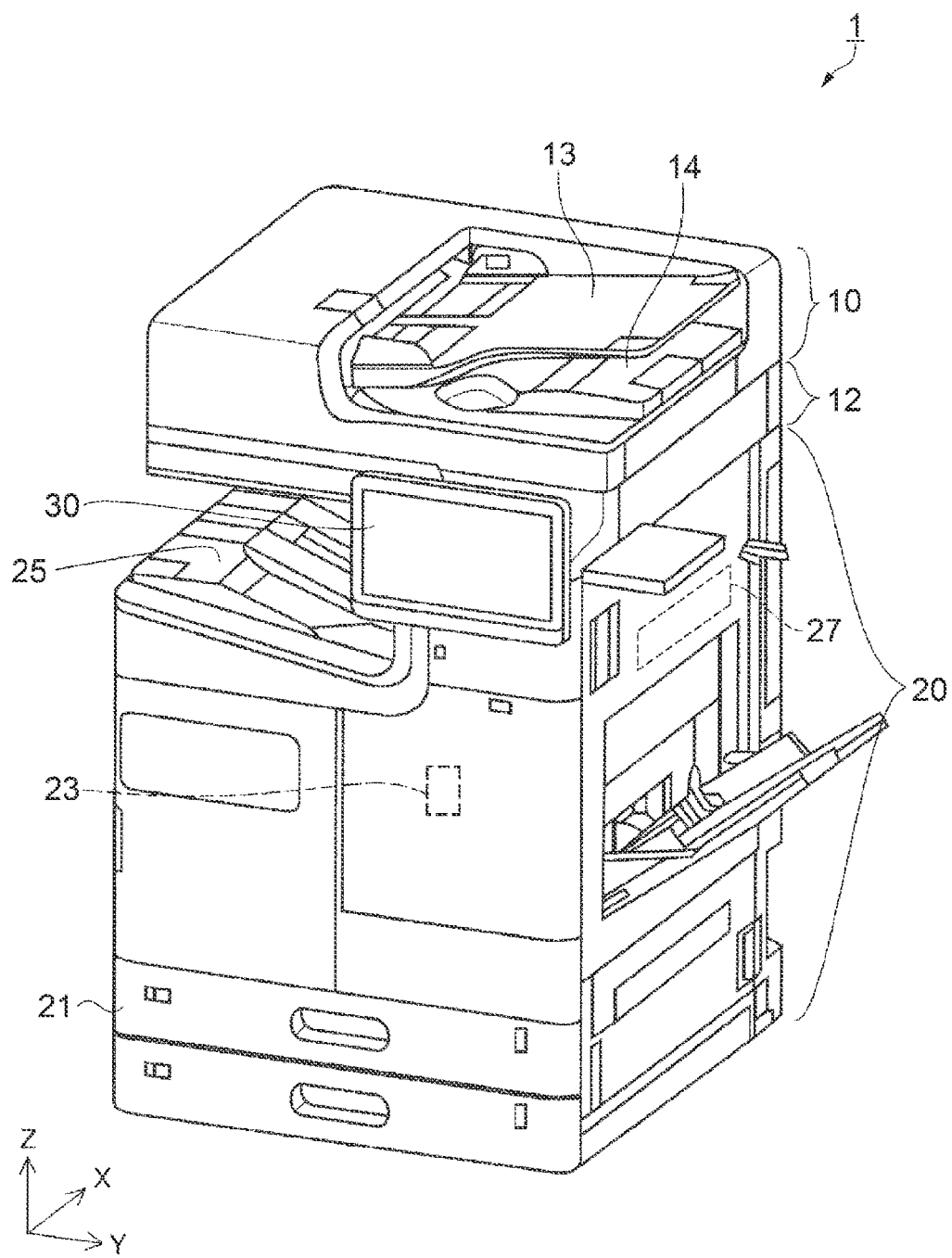
FIG. 1 is a diagram showing an outline of a multifunction device.

FIG. 1 shows an outline of a multifunction device 1. FIG. 1 is a perspective view of the multifunction device 1. The multifunction device 1 includes a reading unit 10 for reading a document, a printing unit 20 for printing, and an operation panel 30.

The multifunction device 1 has a printing function of printing on a medium and a copying function of reading a document and printing the read data on the medium. The multifunction device 1 may have a scanning function of reading a document, generating and saving read data, a fax function of performing fax transmission of read data or data received from the outside. The fax function has a function of receiving fax data from the outside. The multifunction device 1 may have a call function of making a call and a mail function of transmitting a mail.

The reading unit 10 is mounted on a reading unit mounting table 12. The reading unit 10 includes a placement tray 13 on which documents are placed, and a document discharge tray 14 on which documents transported along a transport path are discharged. The reading unit 10 transports the documents placed on the placement tray 13 to the document discharge tray 14 along the transport path. A reading sensor (not shown) is provided in the transport path of the reading unit 10. The reading sensor reads an image formed on the document. The reading unit 10 corresponds to a reading section.

The printing unit 20 includes a paper cassette 21 on which a medium is placed, a printing mechanism 23, and a printed matter discharge tray 25 for discharging the medium printed by the printing mechanism 23. The printing mechanism 23 of the present embodiment is an ink jet recording head that ejects ink to a medium for recording, but a mechanism other than the ink jet recording head may be used.

The printing unit 20 may optionally include a post-processing mechanism (not shown). The post-processing mechanism performs various processing on printed matter printed by the printing unit 20. The processes executed by the post-processing mechanism include a staple process of binding a plurality of printed matters with needles or the like, a punch process of making holes in the printed matter, a folding process of folding the printed matter in half, a shift process of shifting and discharging a plurality of printed matters for each copy, and the like. The post-processing mechanism performs one or more of these processes.

The operation panel 30 displays various icons 110. The icon 110 is an image displayed on the operation panel 30. The icon 110 is an image that accepts an execution instruction to be described later. The plurality of icons 110 displayed on the operation panel 30 are separated from each other. Details of the icon 110 will be described later. The operation panel 30 is a touch panel that accepts touch operations of the user. The operation panel 30 displays an operation screen 100 and an edit screen 105 in a switchable manner.

Figure 2:
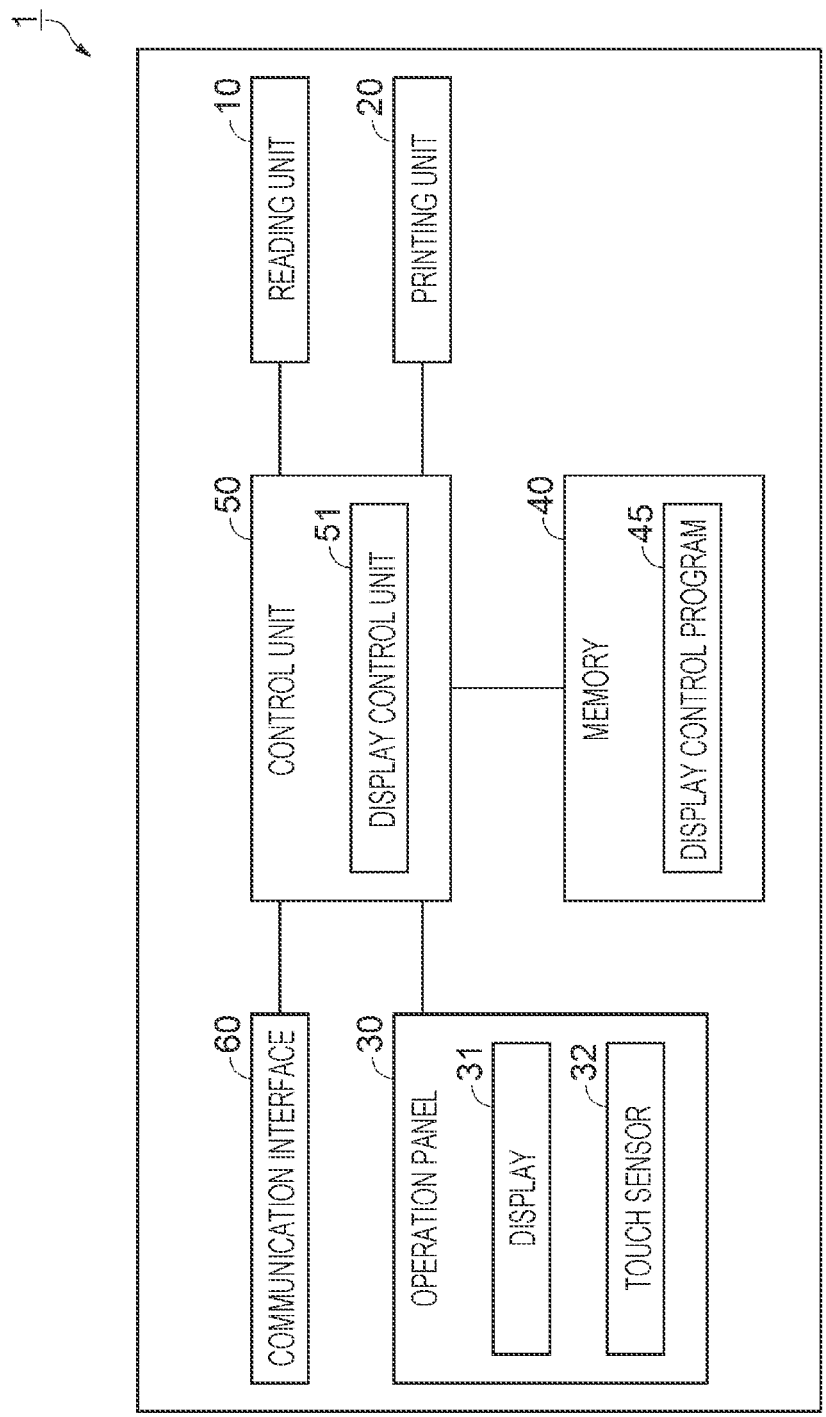
FIG. 2 is a diagram showing a functional block of the multifunction device.

FIG. 2 shows a functional block of the multifunction device 1.

The multifunction device 1 includes the reading unit 10, the printing unit 20, the operation panel 30, a memory 40, a control unit 50, and a communication interface 60.

The operation panel 30 includes a display 31 and a touch sensor 32. The display 31 is composed of a panel such as a liquid crystal panel and an organic electro-luminescence (EL), and displays the operation screen 100, the edit screen 105, and the like. The touch sensor 32 detects various touch operations input by a user. The operation panel 30 corresponds to a display section.

The memory 40 stores various programs such as a read control program that controls the operation of the reading unit 10, a print control program that controls the operation of the printing unit 20, and a display control program 45 that controls the display of the operation panel 30. The program may be composed of one or more packages. The memory 40 stores various data. The display control program 45 controls various displays to be displayed on the operation panel 30, such as a control for switching between the operation screen 100 and the edit screen 105, a control for changing the display mode of the icon 110 selected on the edit screen 105, and a control for changing the display mode of the icon 110 edited on the edit screen 105. The display control program 45 corresponds to an example of a control program.

The memory 40 is composed of a semiconductor storage element such as a flash read only memory (ROM) or another type of non-volatile storage device. The memory 40 may include a random access memory (RAM) that constitutes a work area. The memory 40 may be composed of a magnetic storage device such as a hard disk drive (HDD) or a semiconductor storage device such as a solid state drive (SSD).

The control unit 50 controls each section of the multifunction device 1. The control unit 50 is a controller including a processor 27. The control unit 50 executes the program stored in the memory 40. The control unit 50 receives various instructions based on the user's touch operation input to the touch sensor 32 of the operation panel 30. The control unit 50 controls the reading unit 10, the printing unit 20, the operation panel 30, and the communication interface 60 based on the received instructions. The control unit 50 corresponds to a control section.

The control unit 50 includes a display control unit 51. The display control unit 51 is a functional section implemented by the control unit 50 executing the display control program 45. The display control unit 51 controls the operation panel 30 and controls the display mode of the image to be displayed on the display 31. The display control unit 51 receives various instructions based on the user's touch operation input to the touch sensor 32. The display control unit 51 performs processing for the icon 110 displayed on the display 31 of the operation panel 30 based on the received instruction. The processing for the icon 110 is selection, editing, or the like. The display control unit 51 controls the display or hide of the edited icon 110. The display control unit 51 controls screen switching based on the received instruction. The display control unit 51 displays the operation screen 100, the edit screen 105, and the like on the display 31 by controlling the screen switching. The display control unit 51 corresponds to a display control section.

The communication interface 60 communicates with an external device (not shown), transmits output data output from the control unit 50 to the external device, and receives input data from the external device. The external devices include server devices such as cloud servers and mail servers, personal computers, smartphones, and the like. The communication interface 60 may be connected in a wired manner via a cable, or may be connected in a wireless manner according to an Ethernet (registered trademark) standard or the like. When the multifunction device 1 has a fax function or a call function, the communication interface 60 connects to a telephone line. When the multifunction device 1 connects to a cloud server or a mail server, the communication interface 60 connects to the Internet communication network.

Figure 3:
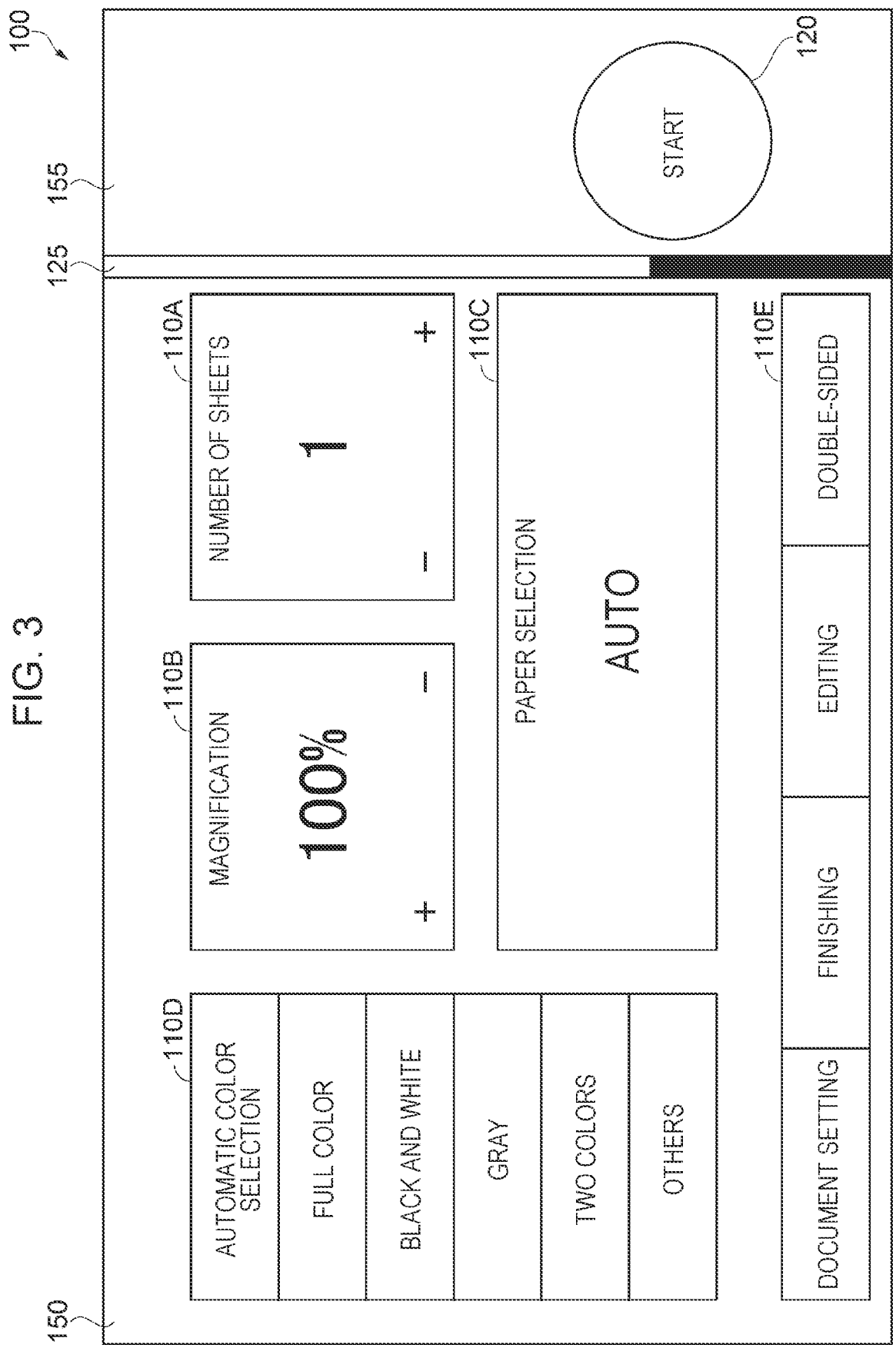
FIG. 3 is a diagram showing an operation screen displayed on an operation panel.

FIG. 3 shows the operation screen 100 displayed on the operation panel 30.

The operation screen 100 is a screen that accepts a user's touch operation and operates the multifunction device 1. The operation screen 100 accepts an execution instruction based on a user's touch operation input by the touch sensor 32. The execution instruction is transmitted to the control unit 50 by the operation panel 30, and instructs the control unit 50 to execute an operation or execute various settings for the reading unit 10, the printing unit 20, and the communication interface 60. The control unit 50 controls the operations of the reading unit 10, the printing unit 20, and the communication interface 60 based on the execution instruction. The execution instructions include execution instructions of various units and setting instructions of various units. The setting instruction involves instructing the settings for the reading unit 10, the printing unit 20, and the communication interface 60.

The operation panel 30 displays the operation screen 100 when the power of the multifunction device 1 is turned on or the like. The operation screen 100 displays the plurality of icons 110. The icon 110 has a plurality of types. The plurality of icons 110 displayed in FIG. 3 are a number-of-sheets designation icon 110A, a magnification designation icon 110B, a paper selection icon 110C, a color setting icon 110D, a printed matter designation icon 110E, and a start instruction icon 120. The number of sheets designation, magnification designation, paper selection, color setting, printed matter designation, and start instruction indicate the type of the icon 110. The icon 110 is a general term for various icons, and is used when various icons are not distinguished.

In FIG. 3, the number-of-sheets designation icon 110A and the paper selection icon 110C are arranged along the first axis (not shown) of the operation screen 100. The number-of-sheets designation icon 110A and the magnification designation icon 110B are arranged along a second axis orthogonal to the first axis (not shown) of the operation screen 100. In the present embodiment, the first axis is represented in a vertical direction, and the second axis is represented in a left-right direction. A direction from the number-of-sheets designation icon 110A to the magnification designation icon 110B is represented as a left direction, and a reverse direction thereof is represented as a right direction. A length along the first axis of the icon 110 or the like is represented as a vertical length. A length along the second axis of the icon 110 or the like is represented as a horizontal length.

The operation screen 100 displays a variable area 150, a fixed area 155, and a scroll bar 125. The variable area 150 is an area whose area changes depending on the arrangement of the icons 110. As an example, when a total length obtained by adding the vertical lengths of the plurality of icons 110 arranged in the vertical direction is longer than the vertical length of the operation panel 30, the operation screen 100 displays the scroll bar 125 to be described later. The fixed area 155 is an area in which the icons 110 that can be arranged are limited and the area of a background image does not increase. The icon 110 arranged in the fixed area 155 cannot be edited.

The number-of-sheets designation icon 110A accepts settings related to the number of sheets of printed matter to be printed when printing or copying is performed by the multifunction device 1. The number-of-sheets designation icon 110A may accept the number of sheets by the number of touch operations by the user. The number-of-sheets designation icon 110A may accept an instruction to display a number-of-sheets setting screen for inputting the number of sheets based on a user's touch operation, and may display the number-of-sheets setting screen on the operation panel 30. "1" displayed on the number-of-sheets designation icon 110A in FIG. 3 indicates that the set number of sheets is one.

The magnification designation icon 110B accepts settings related to the scaling of the printed matter to be printed when printing or copying is performed by the multifunction device 1. The scaling of the printed matter is enlargement or reduction of the original image printed on the printed matter. The magnification designation icon 110B may accept the magnification by the number of touch operations by the user. The magnification designation icon 110B may accept an instruction to display a magnification setting screen for inputting a magnification based on a user's touch operation, and may display the magnification setting screen on the operation panel 30. "100%" displayed on the magnification designation icon 110B in FIG. 3 indicates that the set magnification is 100%. 100% indicates that the magnification is the same as that of the original image.

The paper selection icon 110C accepts settings related to the medium to be fed to the printing unit 20 when printing or copying is performed by the multifunction device 1. The paper selection icon 110C may accept the selection of a paper feed source by the number of touch operations by the user. The paper selection icon 110C may accept an instruction to display a paper setting screen for selecting a paper feed source based on a user's touch operation, and may display the paper setting screen on the operation panel 30. The paper feed source includes an automatic selection to be determined by the control unit 50 based on the document at the time of copying or the print data at the time of printing. "Auto" displayed on the paper selection icon 110C in FIG. 3 indicates that the automatic selection of the paper feed source is selected.

The color setting icon 110D accepts settings related to the color of the printed matter to be printed when printing or copying is performed on the multifunction device 1. The color setting icon 110D displays "automatic color selection", "full color", "black and white", "gray", "two colors", and "others". When any of "automatic color selection", "full color", "black and white", "gray", "two colors", and "others" is selected by the user's touch operation, the color setting icon 110D accepts an instruction related to the color of the printed matter. For example, when "black and white" is selected, the printing unit 20 generates a printed matter of a black and white image. When "automatic color selection" is selected, the control unit 50 selects any color printing, black-and-white printing, and two-color printing based on the document or print data, and causes the printing unit 20 to execute the selected printing.

The printed matter designation icon 110E accepts settings related to the process of the printed matter to be printed when printing or copying is performed by the multifunction device 1 or the operation of the reading unit 10. The printed matter designation icon 110E displays "document setting", "finishing", "editing", and "double-sides". When any one of "document setting", "finishing", "editing", and "double-sided" is selected by a user's touch operation, the operation panel 30 displays various setting screens. The various setting screens display the icon 110. When "document setting" is selected, the operation panel 30 displays a document setting screen. When "finishing" is selected, the operation panel 30 displays a finishing setting screen. When "editing" is selected, the operation panel 30 displays an edit setting screen. When "double-sided" is selected, the operation panel 30 displays a double-sided setting screen. The printed matter designation icon 110E is a folder icon that displays the icon 110 in a lower hierarchy when a user's touch operation is performed.

The start instruction icon 120 accepts instructions to execute various functions of the multifunction device 1. When the start instruction icon 120 accepts a user's touch operation, the operation panel 30 transmits an execution instruction to the control unit 50. Upon receiving the execution instruction, the control unit 50 controls the operations of one or more units of the reading unit 10, the printing unit 20, and the communication interface 60 based on the execution instruction.

The scroll bar 125 indicates the display position of the variable area 150 in the operation screen 100. When the vertical length of the variable area 150 is longer than the vertical length of the display 31 of the operation panel 30, the scroll bar 125 is displayed on the operation screen 100 under the control of the display control unit 51. The scroll bar 125 indicates the vertical position of the variable area 150. When the length obtained by adding the horizontal length of the variable area 150 to the horizontal length of the fixed area 155 is longer than the horizontal length of the operation panel 30, the operation screen 100 may display a second scroll bar (not shown) perpendicular to the scroll bar 125 displayed in FIG. 3. The second scroll bar indicates the horizontal position of the displayed variable area 150.

Figure 4:
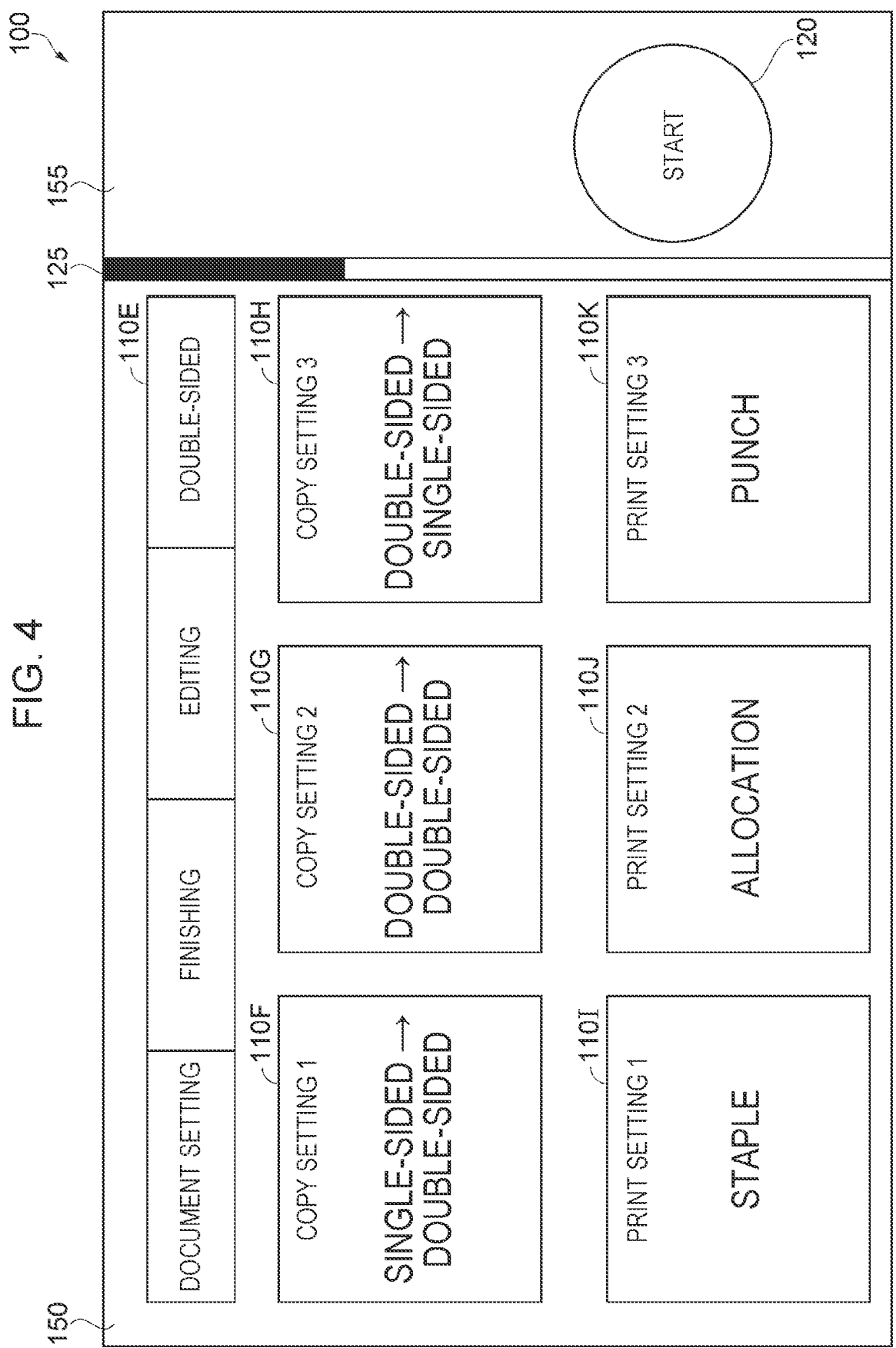
FIG. 4 is a diagram showing a scrolled operation screen.

FIG. 4 shows a scrolled operation screen 100.

The operation screen 100 of FIG. 4 is displayed when the operation screen 100 of FIG. 3 is scrolled downward.

The operation screen 100 of FIG. 4 displays, in the variable area 150, a printed matter designation icon 110E, a single-sided→double-sided setting icon 110F, a double-sided→double-sided setting icon 110G, a double-sided→single-sided setting icon 110H, a staple setting icon 110I, an allocation setting icon 110J, and a punch setting icon 110K. The operation screen 100 of FIG. 4 displays the start instruction icon 120 in the fixed area 155.

The single-sided→double-sided setting icon 110F, the double-sided→double-sided setting icon 110G, and the double-sided→single-sided setting icon 110H relate to copy settings when the multifunction device 1 makes a copy. The staple setting icon 110I, the allocation setting icon 110J, and the punch setting icon 110K relate to print settings when the multifunction device 1 performs printing. The staple setting icon 110I and the punch setting icon 110K relate to settings when the multifunction device 1 is provided with the post-processing mechanism.

The printed matter designation icon 110E and the start instruction icon 120 displayed on the operation screen 100 of FIG. 4 are the same as the printed matter designation icon 110E and the start instruction icon 120 displayed on the operation screen 100 of FIG. 3.

The single-sided→double-sided setting icon 110F accepts a copy setting for reading one side of a document placed on the reading unit 10 and performing double-sided printing. When the single-sided→double-sided setting icon 110F accepts a user's touch operation, the copy operation is set for the multifunction device 1. The copy operation to be set is an operation in which the reading unit 10 reads one side of the document and the printing unit 20 performs double-sided printing based on the read data read by the reading unit 10.

The double-sided→double-sided setting icon 110G accepts a copy setting for reading both sides of a document placed on the reading unit 10 and performing double-sided printing. When the double-sided→double-sided setting icon 110G accepts a user's touch operation, the copy operation is set for the multifunction device 1. The copy operation to be set is an operation in which the reading unit 10 reads both sides of the document and the printing unit 20 performs double-sided printing based on the read data read by the reading unit 10.

The double-sided→single-sided setting icon 110H accepts a copy setting for reading both sides of a document placed on the reading unit 10 and performing single-sided printing. When the double-sided→single-sided setting icon 110H accepts a user's touch operation, the copy operation is set for the multifunction device 1. The copy operation to be set is an operation in which the reading unit 10 reads both sides of the document and the printing unit 20 performs single-sided printing based on the read data read by the reading unit 10.

The staple setting icon 110I accepts settings related to staples performed by the post-processing mechanism. The staple setting icon 110I may cause the control unit 50 to transmit an instruction to execute the staple process to the printing unit 20 when the user's touch operation is accepted. The staple setting icon 110I may display a staple processing setting screen for accepting the setting related to the staple process on the operation panel 30 when the user's touch operation is accepted.

The allocation setting icon 110J accepts settings related to allocation printing performed by the printing unit 20. The allocation setting icon 110J may cause the control unit 50 to transmit an instruction to execute allocation printing to the printing unit 20 when the user's touch operation is accepted. The allocation setting icon 110J may display an allocation print setting screen for accepting the setting related to the allocation printing on the operation panel 30 when the user's touch operation is accepted.

The punch setting icon 110K accepts settings related to punches performed by the post-processing mechanism. The punch setting icon 110K may cause the control unit 50 to transmit an instruction to execute the punch process to the printing unit 20 when the user's touch operation is accepted. The punch setting icon 110K may display a punch processing setting screen for accepting the setting related to the punch process on the operation panel 30 when the user's touch operation is accepted.

Figure 5:
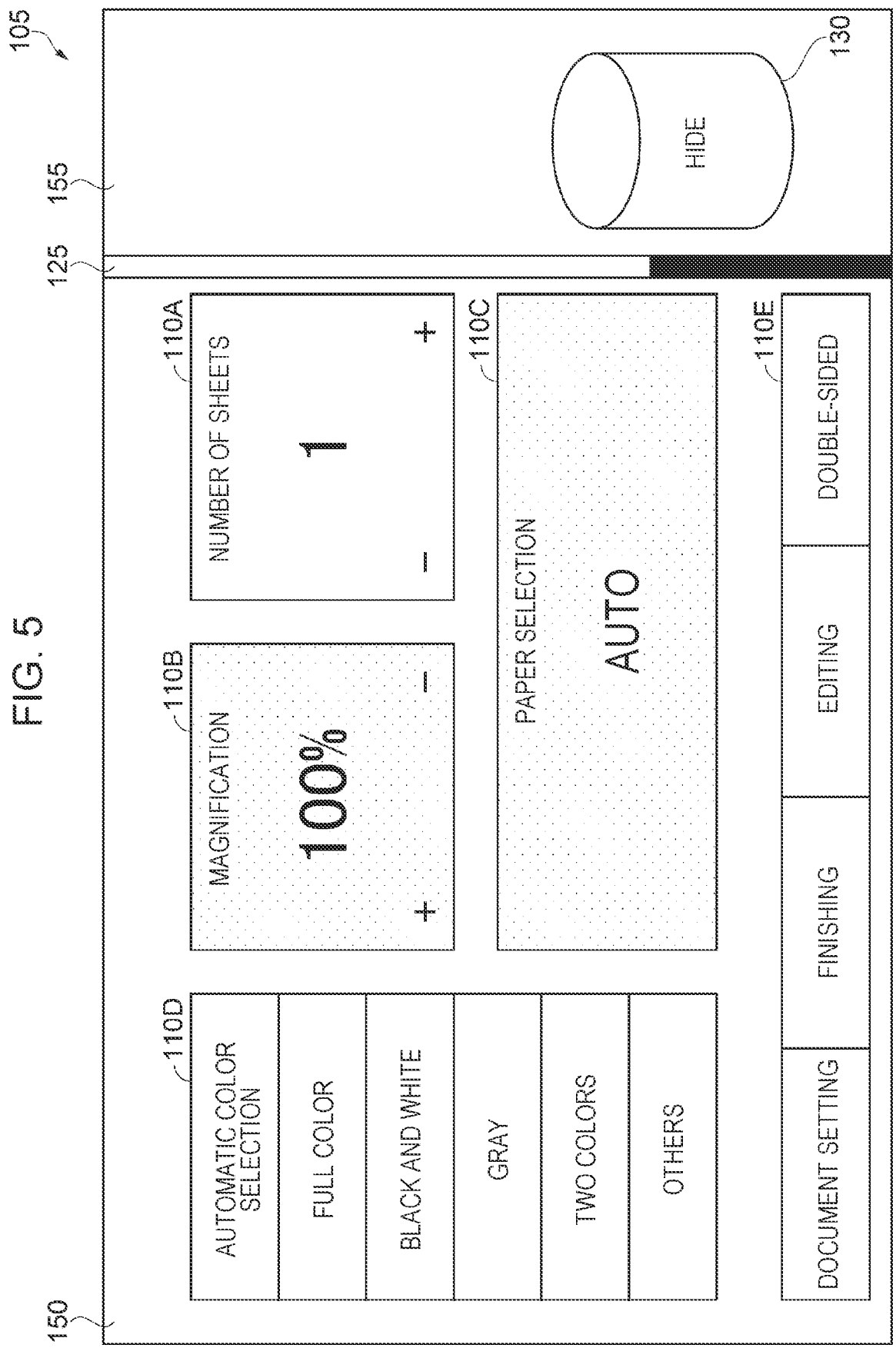
FIG. 5 is a diagram showing an edit screen displayed on the operation panel.
Figure 6:
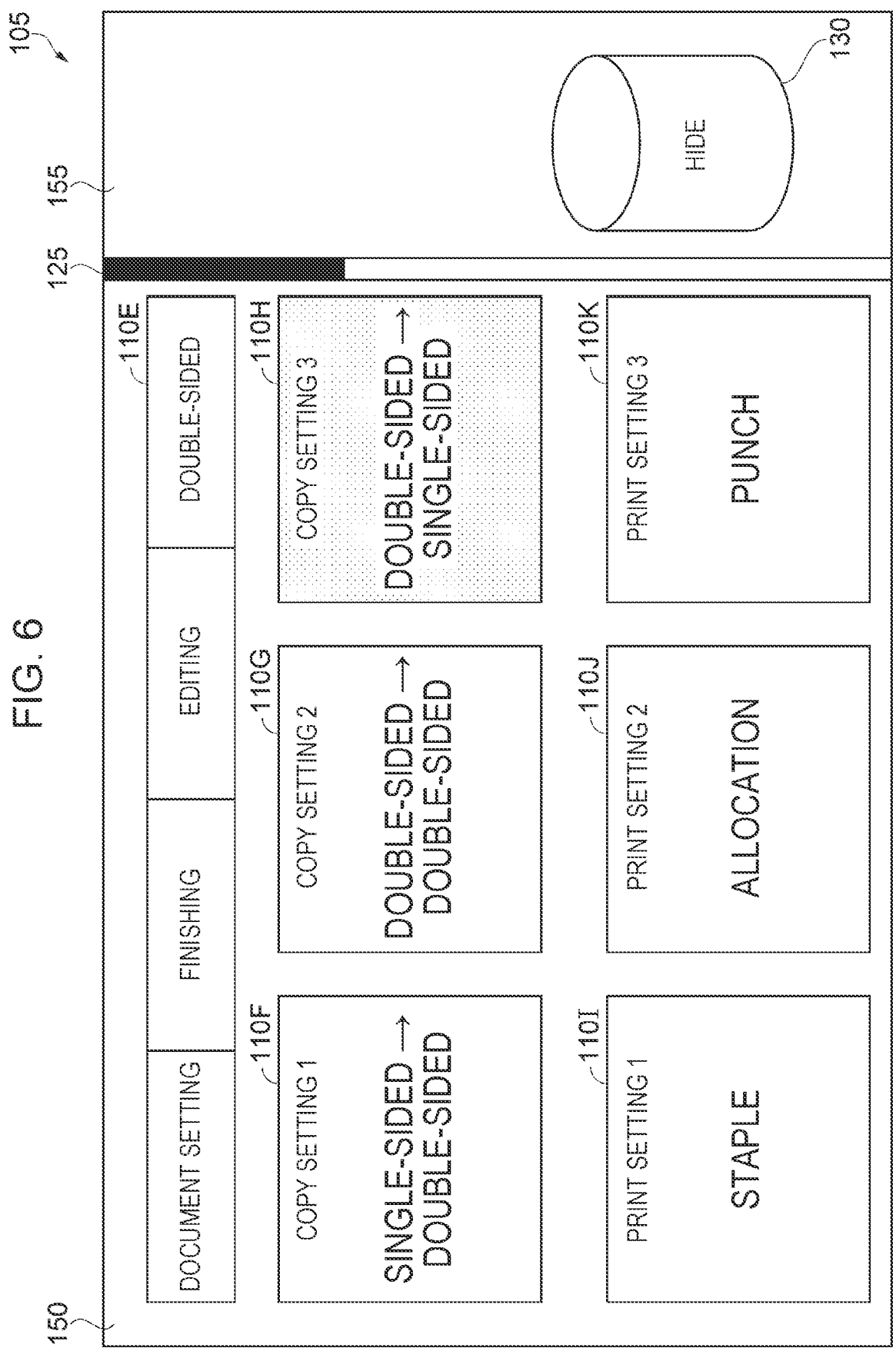
FIG. 6 is a diagram showing a scrolled edit screen.

FIGS. 5 and 6 show an edit screen 105 displayed on the operation panel 30.

The edit screen 105 of FIG. 6 is displayed on the operation panel 30 when the edit screen 105 of FIG. 5 is scrolled downward.

The edit screen 105 is a screen that accepts a user's touch operation and edits an image displayed on the display 31 of the operation panel 30. The image to be edited is an icon 110, a background image of the operation screen 100, and various images displayed on the operation screen 100. Editing the image includes switching between display/hide, transforming the image, changing the color, deleting the image, changing the size, changing the image position, and the like.

The operation panel 30 switches from the operation screen 100 to the edit screen 105 under the control of the display control unit 51. The edit screen 105 accepts a selection instruction of the icon 110 and an edit instruction. The edit screen 105 includes the variable area 150 and the fixed area 155, similar to the operation screen 100. The edit screen 105 of FIG. 5 displays the number-of-sheets designation icon 110A, the magnification designation icon 110B, the paper selection icon 110C, the color setting icon 110D, and the printed matter designation icon 110E similar to the operation screen 100 of FIG. 3. Similar to the operation screen 100 of FIG. 4, the edit screen 105 of FIG. 6 displays the single-sided→double-sided setting icon 110F, the double-sided→double-sided setting icon 110G, the double-sided→single-sided setting icon 110H, the staple setting icon 110I, the allocation setting icon 110J, and the punch setting icon 110K. The edit screen 105 displays a hide setting icon 130 instead of the start instruction icon 120. The start instruction icon 120 is not displayed on the edit screen 105 and cannot be edited. The start instruction icon 120 is not subject to editing. The variable area 150 is an editable area in which the icon 110 can be edited.

The hide setting icon 130 sets the icon 110 to be hidden. The hide setting icon 130 is displayed in the fixed area 155. Among the plurality of icons 110 displayed on the edit screen 105, when the hide setting icon 130 is dropped by the user's touch operation on the selected icon 110, the selected icon 110 is set to be hidden. The drop operation on the hide setting icon 130 corresponds to an example of a second operation. The hide setting icon 130 is not displayed on the operation screen 100. The hide setting icon 130 is displayed on the edit screen 105, but cannot be edited. The hide setting icon 130 is not subject to editing.

The edit screen 105 accepts a selection instruction and an edit instruction. The selection instruction is a command indicating that the icon 110 has been selected by the operation of the user. The edit instruction is a command related to various edits such as a movement instruction, a hide instruction, and a size change instruction.

The selection instruction is output as a user's touch operation based on a tap operation to the icon 110. The tap operation corresponds to an example of a first operation. The selection instruction selects the icon 110 to be edited. When two or more icons 110 are selected by the operation of the user, the selection instruction selects the selected two or more icons as a selection icon group.

The movement instruction included in the edit instruction is output as a user's touch operation based on a slide operation to the selected icon 110. The movement instruction moves the icon 110 or the selection icon group selected by the selection instruction.

The hide instruction included in the edit instruction is output as a user's touch operation when the selected icon 110 is dropped on the hide setting icon 130 by a drag and drop operation. The hide instruction sets the icon 110 or the selection icon group selected by the selection instruction to be hidden. The state at the time of operation will be described later.

The size change instruction included in the edit instruction is output as a user's touch operation based on a pinch-in operation or a pinch-out operation of the selected icon 110. The size change instruction enlarges or reduces the selected icon 110.

First Embodiment

FIGS. 5 and 6 show the edit screen 105 of the first embodiment.

FIGS. 5 and 6 show a state in which a plurality of icons 110 are selected by the selection instruction. The operation panel 30 accepts a selection instruction by a user's touch operation. The operation panel 30 accepts a selection instruction when a tap operation is performed as a user's touch operation. As an example, the operation panel 30 displays the edit screen 105 of FIG. 5 and accepts a selection instruction, and then accepts a user's scroll operation. After accepting the scroll operation, the operation panel 30 displays the edit screen 105 of FIG. 6 and accepts the selection instruction. In FIGS. 5 and 6, the plurality of icons 110 selected by the selection instruction are the magnification designation icon 110B, the paper selection icon 110C, and the double-sided→single-sided setting icon 110H. The display control unit 51 displays the magnification designation icon 110B, the paper selection icon 110C, and the double-sided→single-sided setting icon 110H that have accepted the selection instruction in a display mode different from that of the other icons 110. As an example, the display control unit 51 displays the icon 110 for which the selection instruction has accepted in a color different from that of the icon 110 that has not accepted the selection instruction. By visually recognizing the color of the icon 110, the user can confirm whether or not the icon 110 is selected.

Figure 7:
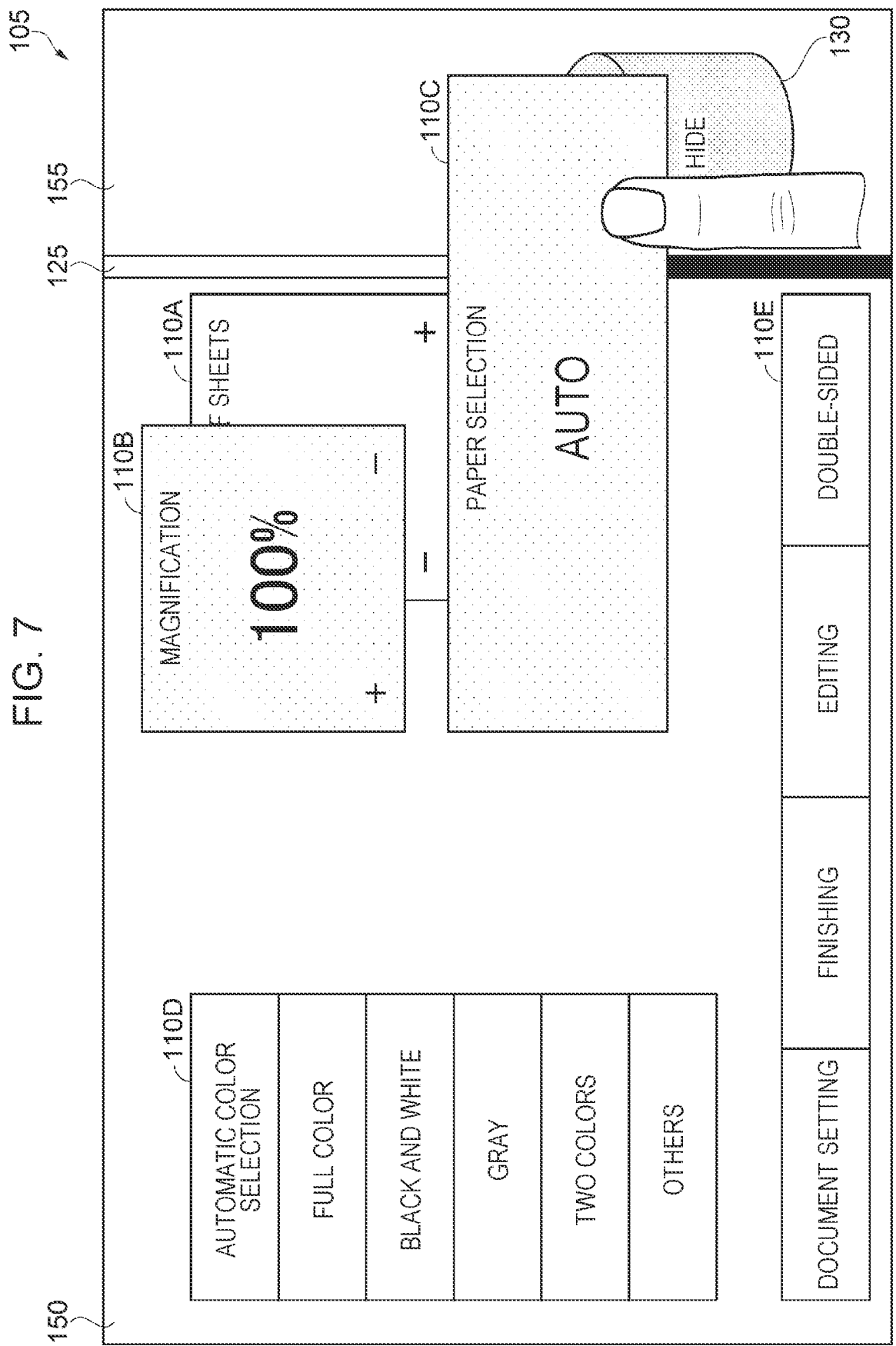
FIG. 7 is a diagram showing the edit screen when a user is performing editing work.

FIG. 7 shows the edit screen 105 when the user is performing editing work.

FIG. 7 is the edit screen 105 when the editing work is being performed in a state in which the plurality of icons 110 shown in FIGS. 5 and 6 are selected. Examples of the icon 110 selected by the selection instruction are magnification designation icon 110B, paper selection icon 110C, and double-sided→single-sided setting icon 110H. Hereinafter, the two or more selected icons 110 are referred to as a selection icon group.

FIG. 7 shows a state in which the selection icon group is moved to the hide setting icon 130 by the operation of the user. The operation panel 30 accepts a movement instruction as an edit instruction for the selection icon group. The user moves the selection icon group by the slide operation among the touch operations.

The operation panel 30 accepts a movement instruction for two or more icons 110, and the display control unit 51 can move two or more icons 110 based on the movement instruction. The movement instruction is included in the edit instruction. The user can perform a movement instruction for two or more icons 110 at once, and can move two or more icons 110. The multifunction device 1 can reduce the troublesomeness of the user at the time of editing work.

When the user moves the selection icon group to a position overlapping the hide setting icon 130 by the slide operation of the user and performs the drop operation, the selection icon group is set to be hidden. When the user performs a drag and drop operation, the selection icon group accepts the setting to be hidden. When any icon 110 of the two or more icons 110 included in the selection icon group is moved to a position where the hide setting icon 130 overlaps, the selection icon group accepts the hide instruction.

FIG. 7 shows a case where the magnification designation icon 110B, the paper selection icon 110C, and the double-sided→single-sided setting icon 110H included in the selection icon group accept the movement instruction and the hide instruction. The hide instruction is not limited to the instruction related to the movement instruction. In a state in which two or more icons 110 are selected based on the selection instruction, the user performs a touch operation on the hide setting icon 130. When a touch operation is performed on the hide setting icon 130, the two or more selected icons 110 may accept the hide instruction.

The two or more icons 110 accept the hide instruction, and the display control unit 51 can hide the two or more icons 110 based on the hide instruction. The hide instruction is included in the edit instruction. The user can perform a hide instruction for two or more icons 110 at once, and can hide the two or more icons 110. The multifunction device 1 can reduce the troublesomeness of the user at the time of editing work.

Figure 8:
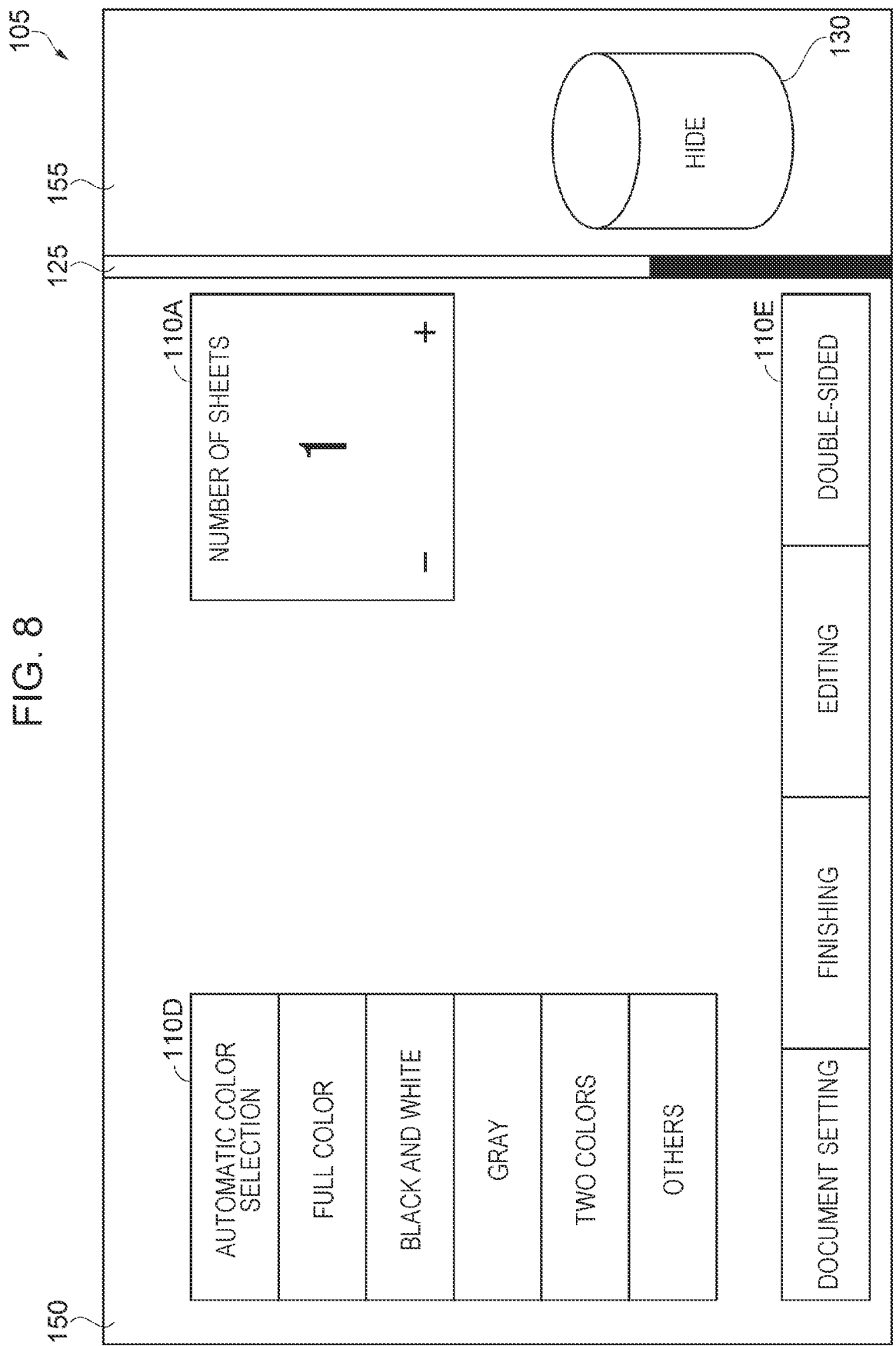
FIG. 8 is a diagram showing the edit screen after editing work is performed.

FIG. 8 shows the edit screen 105 after the editing work is performed.

Figure 9:
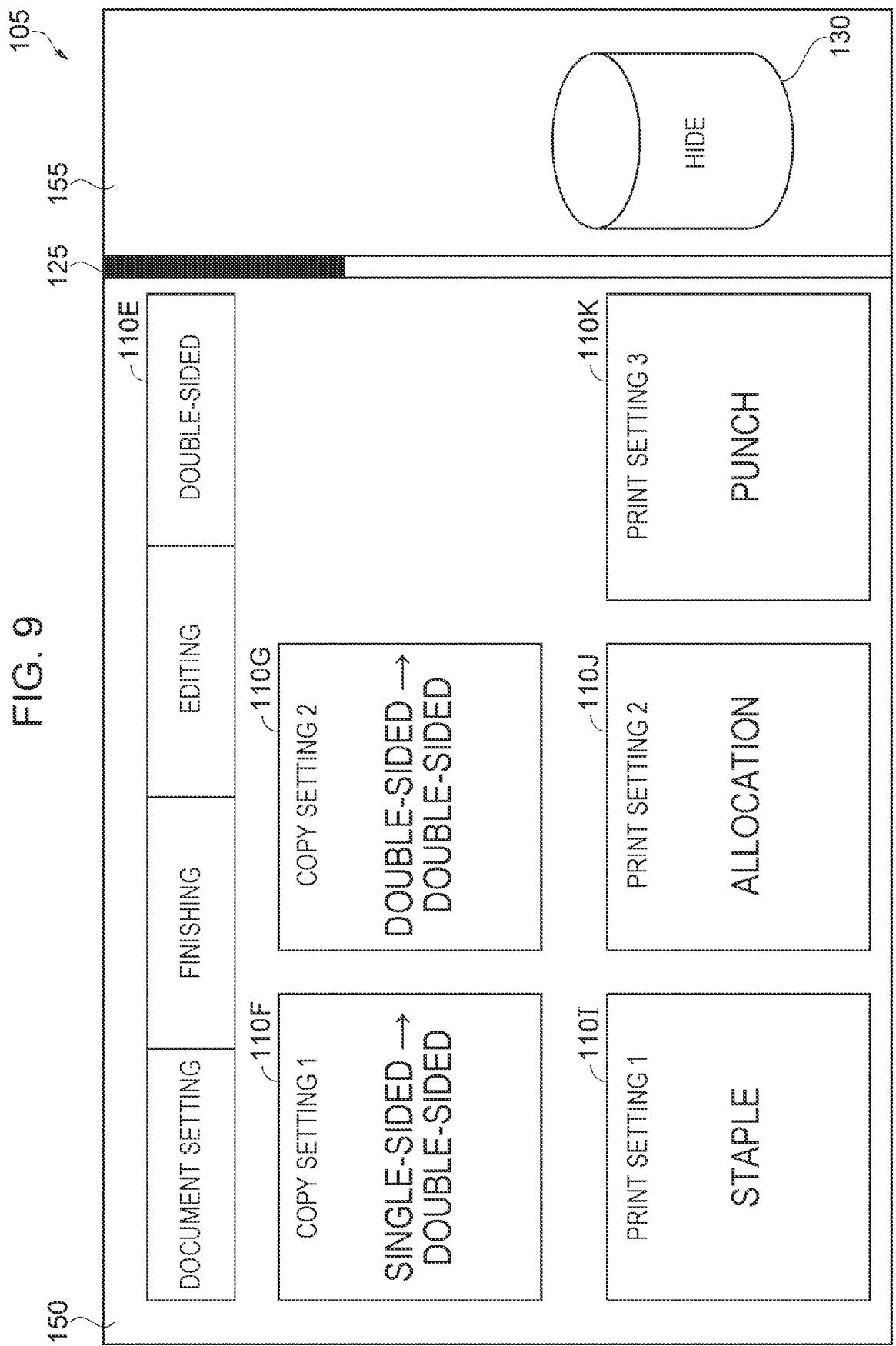
FIG. 9 is a diagram showing a scrolled edit screen after editing work is performed.

FIG. 9 shows a scrolled edit screen 105 after the editing work is performed.

In FIG. 8, the magnification designation icon 110B and the paper selection icon 110C are hidden. In FIG. 9, the double-sided→single-sided setting icon 110H is hidden.

When the edit screen 105 of FIGS. 8 and 9 is switched to the operation screen 100 by a user's touch operation, the operation screen 100 maintains the magnification designation icon 110B, the paper selection icon 110C, and the double-sided→single-sided setting icon 110H hidden.

Figure 10:
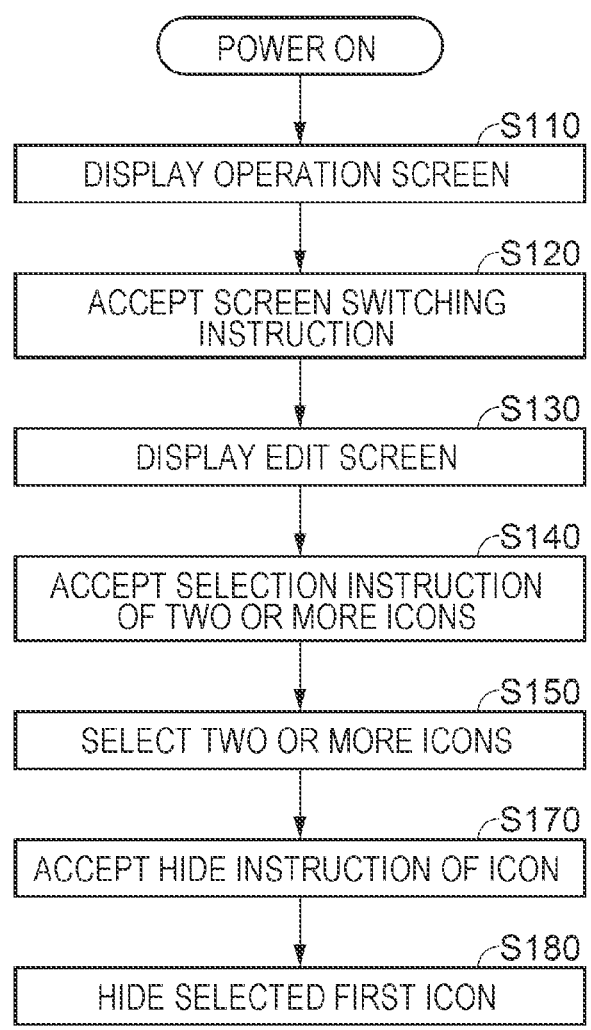
FIG. 10 is a diagram showing a flowchart of editing work.

FIG. 10 shows a flowchart of the editing work.

A control method of the multifunction device 1 according to an editing operation of FIG. 10 is performed by the processor 27 of the display control unit 51 reading the display control program 45 from the memory 40 and executing the display control program 45.

When the user turns on the power of the multifunction device 1, the operation panel 30 displays the operation screen 100 under the control of the display control unit 51, as shown in step S110 of FIG. 10. The timing at which the operation panel 30 displays the operation screen 100 is not limited to when the power is turned on. When the multifunction device 1 is provided with the power saving mode, the operation panel 30 may display the operation screen 100 at the timing when the power saving mode is switched to the normal mode.

In a state in which the operation panel 30 displays the operation screen 100, the multifunction device 1 accepts a screen switching instruction by the user as shown in step S120. The screen switching instruction is a command instructing that the operation screen 100 displayed on the operation panel 30 is switched to the edit screen 105 under the control of the display control unit 51. The multifunction device 1 accepts the screen switching instruction by a touch operation of the user on the operation panel 30. An example of the touch operation is a long-press touch operation on the operation screen 100 by the user. Acceptance of the screen switching instruction is not limited to touch operations on the operation panel 30. When the multifunction device 1 is provided with a screen switching instruction button and the user operates the screen switching instruction button, the multifunction device 1 may accept the screen switching instruction.

As shown in step S130, the display control unit 51 switches the operation screen 100 displayed on the operation panel 30 to the edit screen 105 when the screen switching instruction is accepted. The operation panel 30 displays the edit screen 105. The displayed edit screen 105 displays, in the variable area 150, the number-of-sheets designation icon 110A, the magnification designation icon 110B, the paper selection icon 110C, the color setting icon 110D, the printed matter designation icon 110E, the single-sided→double-sided setting icon 110F, the double-sided→double-sided setting icon 110G, the double-sided→single-sided setting icon 110H, the staple setting icon 110I, the allocation setting icon 110J, and the punch setting icon 110K. When the display control unit 51 switches from the operation screen 100 to the edit screen 105, the operation panel 30 displays the icon 110 displayed in the variable area 150 in the same display mode.

The operation panel 30 accepts a user's touch operation in a state in which the edit screen 105 is displayed. The display control unit 51 accepts a selection instruction of two or more icons 110 as shown in step S140 based on the user's touch operation.

As shown in step S150, the display control unit 51 selects two or more icons 110 that have accepted the selection instruction. The display control unit 51 displays the two or more selected icons 110 in a display mode different from that of the icons 110 that do not accept the selection instruction, as shown in FIGS. 5 and 6. The two or more selected icons 110 are referred to as a selection icon group.

As shown in step S170, the display control unit 51 accepts an edit instruction of the selection icon group based on the user's touch operation. The edit instructions to be accepted are a movement instruction, a hide instruction, a size change instruction, and the like. The edit instructions are not limited to these. It is sufficient that the edit instruction is any instruction for editing the icon 110.

When the display control unit 51 accepts the edit instruction, the display control unit 51 edits the selection icon group as shown in step S180.

When the edit instruction is a movement instruction, the display control unit 51 moves the selection icon group as shown in FIG. 7. The display control unit 51 moves a plurality of icons 110 included in the selection icon group based on the movement instruction.

When the edit instruction is a hide instruction, the display control unit 51 performs a setting for hiding the selection icon group. The display control unit 51 sets the plurality of icons 110 included in the selection icon group to be hidden based on the hide instruction. The operation panel 30 does not display the icon 110 set to be hidden.

When the edit instruction is a size change instruction, the display control unit 51 performs a setting for changing the size of each of the two or more icons included in the selection icon group. The operation panel 30 displays the resized icon 110 based on the setting for changing the size.

The control method and control program of the multifunction device 1 can edit a plurality of icons 110 at once, and the multifunction device 1 can reduce the troublesomeness of the user's editing work.

Second Embodiment

A second embodiment shows a case where the icon 110 that maintains the display when the hide instruction is accepted is included in the plurality of icons 110.

In the second embodiment, the memory 40 stores in advance settings corresponding to various instructions for each of the number-of-sheets designation icon 110A, the magnification designation icon 110B, the color setting icon 110D, the printed matter designation icon 110E, the single-sided→double-sided setting icon 110F, the double-sided→double-sided setting icon 110G, the double-sided→single-sided setting icon 110H, the staple setting icon 110I, the allocation setting icon 110J, and the punch setting icon 110K. The selection setting is a setting for accepting a selection instruction and being selected. The movement setting is a setting for accepting a movement instruction and moving. The hide setting is a setting for accepting a hide instruction and hiding the icon. The size change setting is a setting for accepting a size change instruction and resizing. These settings are stored in advance in association with the type of the icon 110. The setting for accepting the hide instruction and hiding the icon corresponds to an example of a first setting.

The memory 40 stores settings corresponding to various instructions for the paper selection icon 110C. The selection setting is a setting for accepting a selection instruction and being selected. The movement setting is a setting for accepting a movement instruction and moving. The hide setting is a setting for accepting a hide instruction and maintaining the display. The size change setting is a setting for accepting a size change instruction and resizing. These settings are stored in advance in association with the type of the icon 110. The setting for accepting the hide instruction and maintaining the display corresponds to an example of a second setting.

Figure 11:
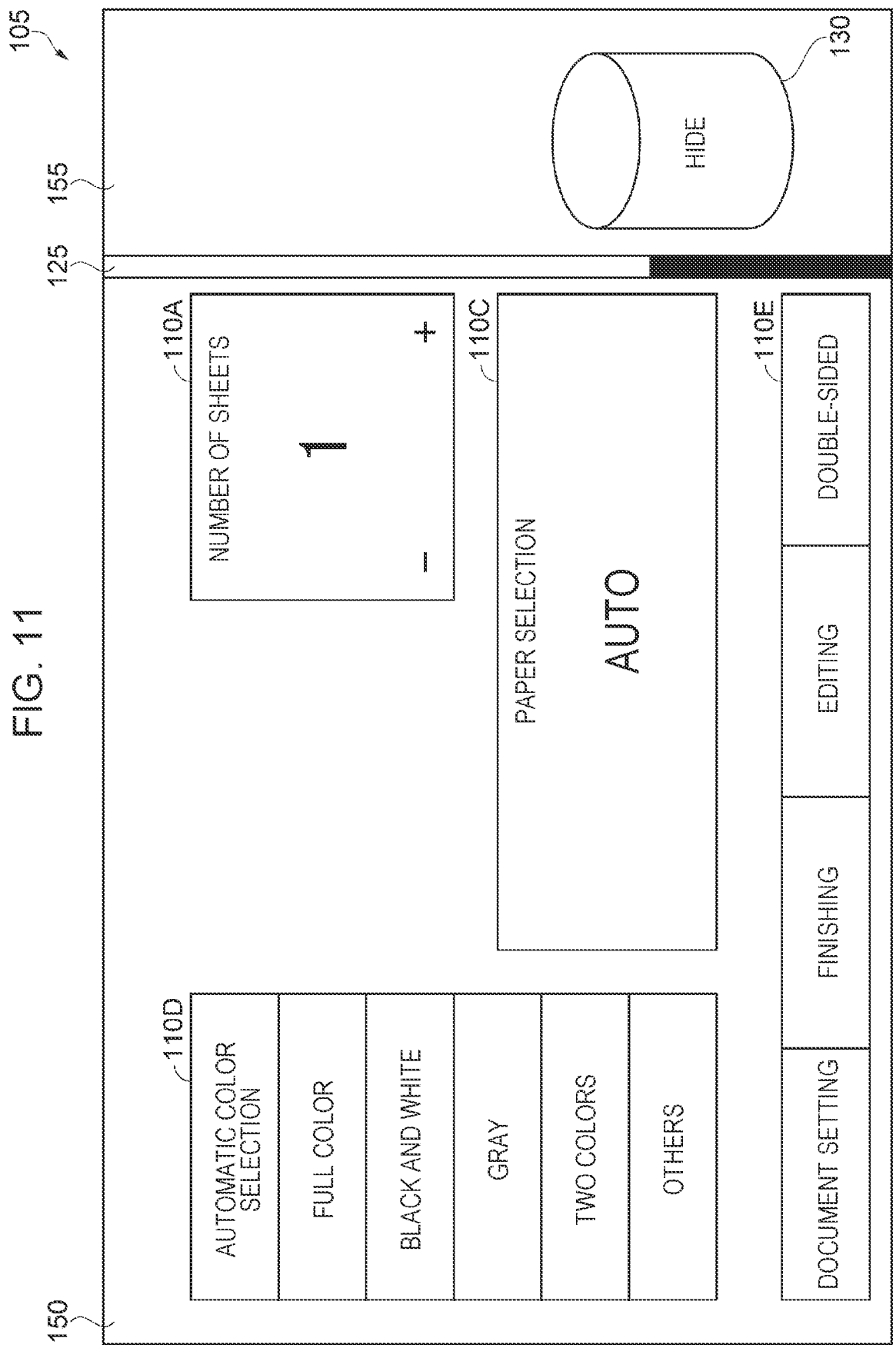
FIG. 11 is a diagram showing the edit screen after editing work is performed.

As shown in FIG. 5, the magnification designation icon 110B and the paper selection icon 110C are selected by accepting the selection instruction. After the display control unit 51 selects the magnification designation icon 110B and the paper selection icon 110C, the magnification designation icon 110B and the paper selection icon 110C accept the hide instruction as shown in FIG. 7. FIG. 11 shows a result of editing when the magnification designation icon 110B and the paper selection icon 110C accept the hide instruction.

As shown in FIG. 11, based on the hide instruction, the display control unit 51 hides the magnification designation icon 110B, does not hide the paper selection icon 110C, and maintains the display. The magnification designation icon 110B has a setting for accepting a hide instruction and hiding the magnification designation icon 110B. The paper selection icon 110C has a setting for accepting a hide instruction and maintaining the display. Based on these settings, the display control unit 51 performs control such that the editing result shown in FIG. 11 is displayed on the operation panel 30.

The memory 40 has a setting when an edit instruction is accepted for each icon 110. When the selection icon group having the selected plurality of icons 110 accepts the edit instruction, the display control unit 51 edits each icon 110 based on the setting stored in the memory 40. When the selection icon group has an icon 110 having a setting for accepting a hide instruction and hiding the icon, and an icon 110 having a setting for accepting a hide instruction and maintaining the display, the display control unit 51 performs the following control. The display control unit 51 hides the icon 110 having a setting for accepting the hide instruction and hiding the icon. The display control unit 51 does not hide the icon 110 having a setting for accepting the hide instruction and maintaining the display, and maintains the display. In the second embodiment, the magnification designation icon 110B corresponds to the icon 110 having a setting for accepting a hide instruction and hiding the icon. The magnification designation icon 110B corresponds to an example of a first icon. The paper selection icon 110C corresponds to the icon 110 having a setting for accepting a hide instruction and maintaining the display. The paper selection icon 110C corresponds to an example of a second icon. When the display control unit 51 edits each of the icons 110 included in the selection icon group based on the settings stored in advance, the multifunction device 1 can reduce the user from making unexpected edits.

Figure 12:
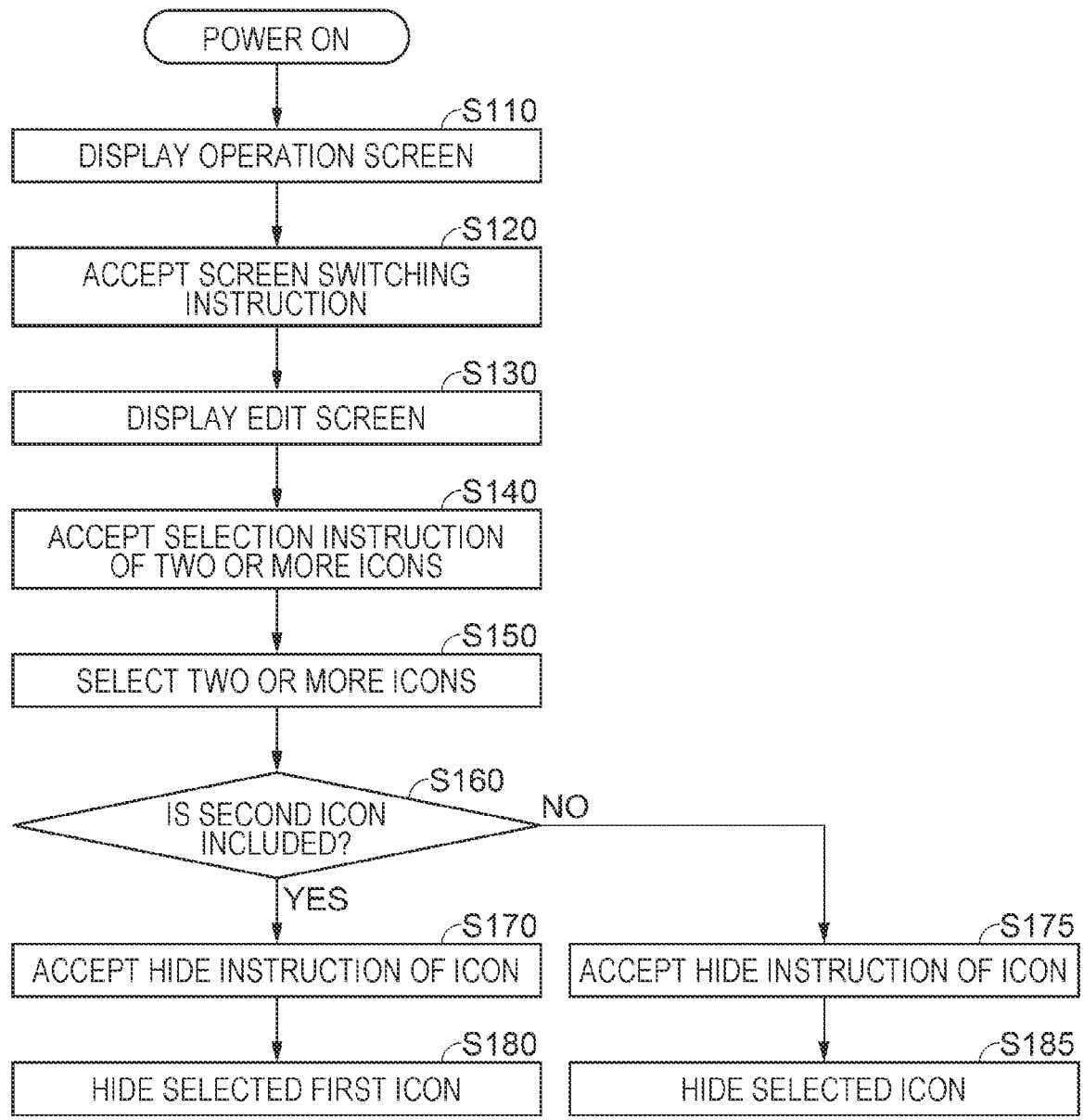
FIG. 12 is a diagram showing a flowchart of editing work.

FIG. 12 shows a flowchart of the editing work in the second embodiment.

In FIG. 12, steps S110 to S150 are the same as those in the first embodiment.

After the display control unit 51 selects two or more icons 110 in step S150, the display control unit 51 determines whether or not the second icon is included in the two or more selected icons 110 in step S160. The two or more selected icons 110 are referred to as a selection icon group. When the selection icon group includes the second icon, the process proceeds to step S170. When the selection icon group does not include the second icon, the process proceeds to step S175.

In step S170, the selection icon group accepts the hide instruction. When the selection icon group accepts the hide instruction, the display control unit 51 hides the first icon of the two or more icons 110 in step S180. The display control unit 51 does not hide the second icon of the two or more icons 110, and maintains the display.

In step S175, the selection icon group accepts the hide instruction. When the selection icon group accepts the hide instruction, the display control unit 51 hides the selection icon group in step S185. The display control unit 51 hides two or more selected icons 110 at once.

When the two or more selected icons 110 have all a setting for accepting the hide instruction and hiding the icons, the multifunction device 1 hides the two or more selected icons 110 at once. The user can reduce the time and effort when editing, and the workability at the time of editing is improved.

When the selected two or more icons 110 include a second icon having a setting for accepting a hide instruction and maintaining the display, the display control unit 51 maintains the display of the second icon. The multifunction device 1 controls editing based on the settings stored in advance. When the user makes edits, unexpected edits are reduced.

Third Embodiment

Figure 13:
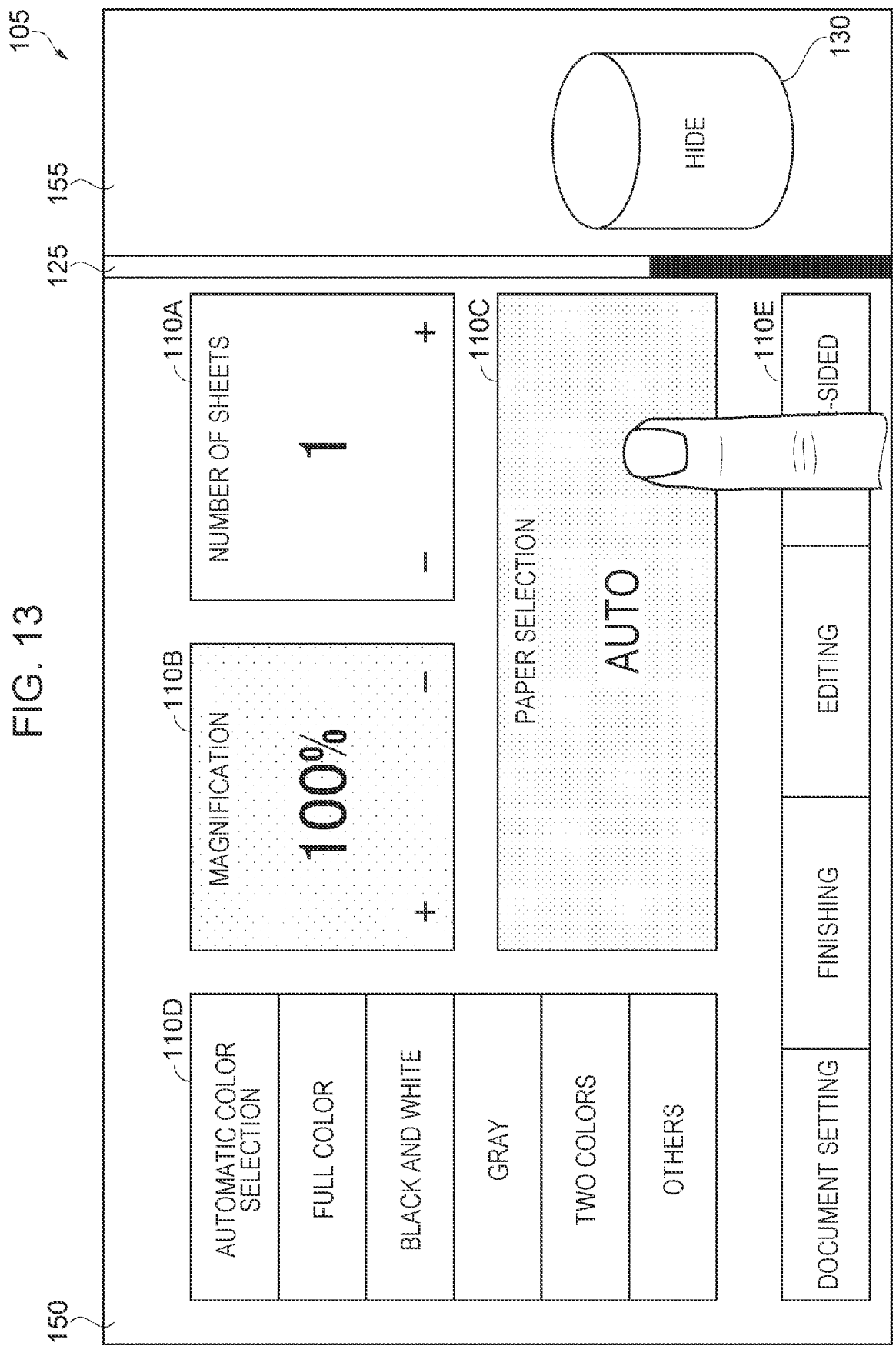
FIG. 13 is a diagram showing the edit screen displayed on the operation panel.

FIG. 13 shows the edit screen 105 of a third embodiment.

The edit screen 105 of FIG. 13 is a state when the icon 110 displayed on the operation panel 30 is accepting a selection instruction in step S140 of FIG. 10. The edit screen 105 of FIG. 13 shows a case where the magnification designation icon 110B and the paper selection icon 110C accept the selection instruction, as in the edit screen 105 of FIG. 5.

In the third embodiment, the memory 40 stores in advance settings corresponding to various instructions for each of the number-of-sheets designation icon 110A, the magnification designation icon 110B, the color setting icon 110D, the printed matter designation icon 110E, the single-sided-→double-sided setting icon 110F, the double-sided-→double-sided setting icon 110G, the double-sided→single-sided setting icon 110H, the staple setting icon 110I, the allocation setting icon 110J, and the punch setting icon 110K. The selection setting is a setting for accepting a selection instruction and being selected. The movement setting is a setting for accepting a movement instruction and moving. The hide setting is a setting for accepting a hide instruction and hiding the icon. The size change setting is a setting for accepting a size change instruction and resizing. These settings are stored in advance in the memory 40 in association with the type of the icon 110. The setting for accepting the hide instruction and hiding the icon corresponds to an example of a first setting.

The memory 40 stores settings corresponding to various instructions for the paper selection icon 110C. The selection setting is a setting for accepting a selection instruction and being selected. The movement setting is a setting for accepting a movement instruction and moving. The hide setting is a setting for accepting a hide instruction and maintaining the display. The size change setting is a setting for accepting a size change instruction and resizing. These settings are stored in advance in the memory 40 in association with the type of the icon 110. The setting for accepting the hide instruction and maintaining the display corresponds to an example of a second setting.

When the display control unit 51 accepts the selection instruction, the display mode is different between the magnification designation icon 110B and the paper selection icon 110C. The display mode is a color, a frame thickness of the icon 110, a pattern, and the like. When the icon 110 accepts the selection instruction, the display control unit 51 displays the icons having different settings in different display modes. By visually recognizing the display mode of the icon 110 when the icon 110 is selected, the user can confirm that the icon 110 having different settings is selected when the user selects two or more icons. By confirming that the icon 110 having a different setting is selected, the user can reduce unnecessary editing operations.

In the third embodiment, the display control unit 51 changes the display mode of the icon 110 when the selection instruction is accepted, but the present disclosure is not limited thereto. When the display control unit 51 displays the edit screen 105 in step S130 of FIG. 10, the display mode of the icons 110 having different settings may be different.

Fourth Embodiment

Figure 14:
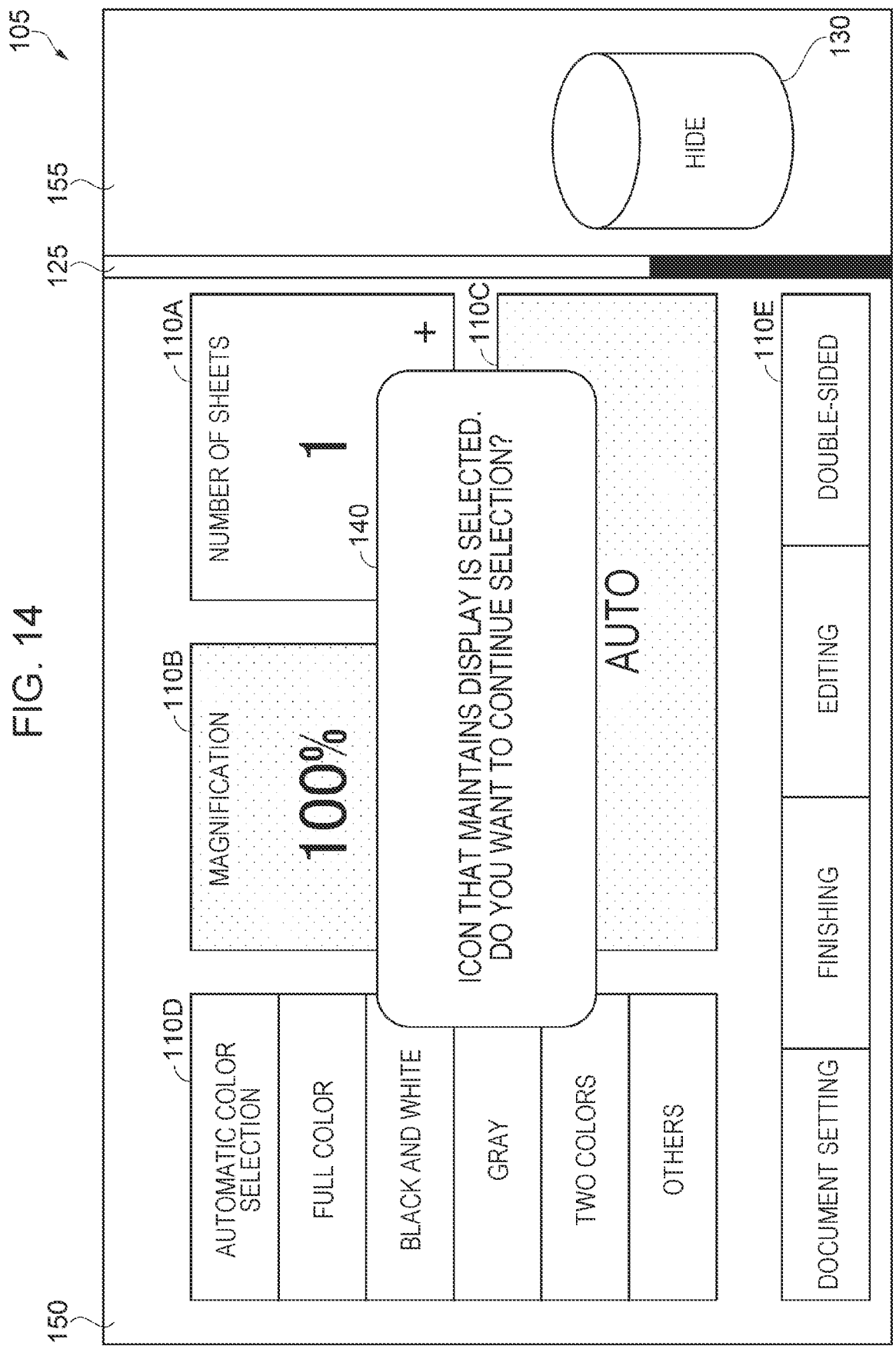
FIG. 14 is a diagram showing the edit screen when a plurality of icons are selected.

FIG. 14 shows the edit screen 105 of a fourth embodiment.

The edit screen 105 of FIG. 14 is a state when the icon 110 displayed on the operation panel 30 is accepting a selection instruction in step S140 of FIG. 10. The edit screen 105 of FIG. 14 shows a case where the magnification designation icon 110B and the paper selection icon 110C accept the selection instruction, as in the edit screen 105 of FIG. 5. A message 140 is displayed when the paper selection icon 110C accepts the selection instruction. The message 140 corresponds to an example of notification.

In the fourth embodiment, the memory 40 stores the same settings as those in the third embodiment in advance for each icon 110. The magnification designation icon 110B and the paper selection icon 110C have different settings.

When the paper selection icon 110C accepts the selection instruction, the display control unit 51 displays the message 140. The content of the message 140 displayed in FIG. 14 is "The icon that maintains the display is selected. Do you want to continue the selection?". The content of the message 140 is not limited thereto. It is sufficient that the content of the message 140 is any content related to the setting of each icon 110. The message 140 in FIG. 14 indicates that the selected paper selection icon 110C has a setting different from that of the magnification designation icon 110B.

By visually recognizing the message 140, the user can confirm that the icon 110 having a different setting has been selected. By confirming the message 140, the user can reduce unnecessary editing work.

As described above, the multifunction device includes a reading unit that reads a document, a printing unit that performs printing on a medium, an operation panel that accepts instructions including an execution instruction and an edit instruction from a user and displays an operation screen including a plurality of icons and an edit screen including the plurality of icons, and a display control section that switches the display of the operation panel to the operation screen or the edit screen. The operation panel accepts the execution instruction to execute the reading unit or the printing unit when the operation screen is displayed. The operation panel accepts a selection instruction to select the icon and the edit instruction to edit the icon selected by the selection instruction when the edit screen is displayed. The display control section selects two or more of the icons as a selection icon group when the operation panel accepts the selection instruction for the two or more icons. The display control section edits the selection icon group when the operation panel accepts the edit instruction for the selection icon group.

Since the user can select and edit a plurality of icons on the edit screen, the troublesomeness at the time of editing work can be reduced.

The edit instruction includes a hide instruction to hide the icon.

The user can hide a plurality of icons at once.

The plurality of icons include a first icon that includes a setting for hiding the first icon when the operation panel accepts the hide instruction, and a second icon that includes a setting for maintaining display of the second icon when the operation panel accepts the hide instruction.

By including an icon that is not set to be hidden, the multifunction device can suppress deterioration of operability when the user sets it to be hidden.

When the icons included in the selection icon group are all the first icons and the operation panel accepts the hide instruction for the selection icon group, the display control section hides the selection icon group.

When the two or more icons selected in the selection instruction are the first icon including a setting for hiding the first icon, the user can hide the two or more icons at once. Since the user can hide two or more icons, the troublesomeness at the time of editing work can be further reduced.

When the icons included in the selection icon group are the first icon and the second icon, and the operation panel accepts the hide instruction for the selection icon group, the display control section hides the first icon included in the selection icon group and maintains the display of the second icon.

The user can prevent the second icon from being hidden when the icon that maintains the display is included and selected.

When two or more of the icons accept the selection instruction, the display control section makes the display mode of the first icon different from that of the second icon.

When the user selects two or more icons, the user can grasp that the icon includes an icon that is not set to be hidden. The user can determine whether or not to continue the hide instruction by grasping that the icon includes an icon that is not set to be hidden.

When the edit instruction includes a movement instruction, and the operation panel accepts the movement instruction for the selection icon group, the display control section moves the selection icon group for which the movement instruction has accepted based on the movement instruction.

The user can move two or more icons for which a selection instruction is provided at once. The user can perform operations other than the hide setting all at once.

A first operation of the user indicating the selection instruction on the operation panel is different from a second operation of the user indicating the hide instruction.

By making the operation indicating the selection instruction and the operation indicating the hide instruction different, the multifunction device can easily recognize the type of operation.

The control method of the multifunction device is a control method of a multifunction device including an operation panel that accepts instructions including an execution instruction and an edit instruction from a user and displays an operation screen and an edit screen, a reading unit that reads a document, and a printing unit that performs printing on a medium. The operation panel displays the operation screen including a plurality of icons for accepting the execution instruction to execute the reading unit or the printing unit. The operation panel displays, in a switchable manner, from the operation screen to the edit screen that includes the plurality of icons and accepts a selection instruction to select the icon from among the plurality of icons and the edit instruction to edit the icon selected by the selection instruction. When the two or more icons accept the selection instruction, the multifunction device selects the two or more icons as the selection icon group. When the operation panel accepts the edit instruction for the selection icon group, the multifunction device edits the selection icon group.

Since the user can select a plurality of icons on the edit screen, the troublesomeness at the time of editing work can be reduced.

The control program is a control program executed by a processor of a multifunction device including an operation panel that accepts instructions including an execution instruction and an edit instruction from a user and displays an operation screen and an edit screen, a reading unit that reads a document, and a printing unit that performs printing on a medium. The control program displays the operation screen including a plurality of icons for accepting the execution instruction to execute the reading unit or the printing unit on the operation panel. The control program displays, on the operation panel in a switchable manner, from the operation screen to the edit screen that displays the plurality of icons and accepts a selection instruction to select the icon from among the plurality of icons and the edit instruction to edit the icon selected by the selection instruction. The control program edits the selection icon group when the operation panel accepts the edit instruction for the selection icon group.

Since the user can select a plurality of icons on the edit screen, the troublesomeness at the time of editing work can be reduced.

The function of the display control section may be realized by one or more processors or a semiconductor chip. For example, the display control section may be configured to further include a sub-processing device (co-processor) such as a system-on-a-chip (SoC), a micro control unit (MCU), and a field-programmable gate array (FPGA). The display control section may cooperate with both the CPU and the sub-processing device, or may selectively use one of the two to perform various controls.

The processing units of the flowcharts of FIGS. 10 and 12 are divided according to the main processing contents in order to make the processing of the multifunction device easy to understand, and is not limited by the method and name of division of the processing unit. The processing of each step may be divided into more processing units depending on the processing content. One processing unit may be divided to include more processing. The order of processing may be appropriately changed as long as it does not interfere with the purpose.

Although the control method according to the present embodiment shows a case where the processor included in the multifunction device is realized by executing the program, the program executed by the processor in order to realize the control method can be configured in the form of a recording medium recorded in a computer-readable manner or a transmission medium for transmitting the display control program. As the recording medium, a magnetic or optical recording medium or a semiconductor memory device can be used. Examples of the recording medium include a portable or fixed recording medium such as a flexible disk, HDD, a compact disk read only memory (CD-ROM), a digital versatile disk (DVD), a Blu-ray (registered trademark) disc, a magneto-optical disk, a flash memory, and a card type recording medium. The recording medium may be a non-volatile storage device such as a RAM, a ROM, or an HDD included in the multifunction device.

What is claimed is:

1. A multifunction device comprising:
a scanner that reads a document;
a printer that performs printing on a medium;
an operation panel that accepts instructions including an execution instruction and an edit instruction from a user and displays an operation screen including a plurality of icons and an edit screen including the plurality of icons; and
a display control section that switches display of the operation panel to the operation screen or the edit screen, wherein
the operation panel accepts the execution instruction to execute the scanner or the printer when the operation screen is displayed,
the operation panel accepts a selection instruction to select the icon and the edit instruction to edit the icon selected by the selection instruction when the edit screen is displayed,
the display control section selects two or more of the icons as a selection icon group when the operation panel accepts the selection instruction for the two or more icons and displays the two or more of the icons of the selection icon group together with a non-selected icon of the icons that has not been selected as the selection icon group in the edit screen on the operation panel such that a display mode of the two or more of the icons in the edit screen is different from a display mode of the non-selected icon of the icons in the edit screen, and
the display control section edits the two or more of the icons of the selection icon group together when the operation panel accepts the edit instruction for the selection icon group.

2. The multifunction device according to claim 1, wherein the edit instruction includes a hide instruction to hide the icon.

3. The multifunction device according to claim 2, wherein the plurality of icons include a first icon that includes a setting for hiding the first icon when the operation panel accepts the hide instruction, and a second icon that includes a setting for maintaining display of the second icon when the operation panel accepts the hide instruction.

4. The multifunction device according to claim 3, wherein when the icons included in the selection icon group are all the first icons and the operation panel accepts the hide instruction for the selection icon group, the display control section hides the selection icon group.

5. The multifunction device according to claim 3, wherein when the selection icon group includes both the first icon and the second icon, and the operation panel accepts the hide instruction for the selection icon group, the display control section hides the first icon included in the selection icon group and maintains the display of the second icon.

6. The multifunction device according to claim 3, wherein when the operation panel accepts the selection instruction for the icon, the display control section makes a display mode of the first icon different from that of the second icon.

7. The multifunction device according to claim 1, wherein when the edit instruction includes a movement instruction, and the operation panel accepts the movement instruction for the selection icon group, the display control section moves the selection icon group for which the movement instruction was accepted based on the movement instruction.

8. The multifunction device according to claim 2, wherein a first operation of the user indicating the selection instruction on the operation panel is different from a second operation of the user indicating the hide instruction.

9. A control method of a multifunction device including an operation panel that accepts instructions including an execution instruction and an edit instruction from a user and displays an operation screen and an edit screen, a scanner that reads a document, and a printer that performs printing on a medium, the control method comprising:
  displaying, on the operation panel, the operation screen including a plurality of icons for accepting the execution instruction to execute the scanner or the printer;
  displaying, on the operation panel in a switchable manner, from the operation screen to the edit screen that includes the plurality of icons and accepts a selection instruction to select the icon from among the plurality of icons and the edit instruction to edit the icon selected by the selection instruction;
  selecting two or more of the icons as a selection icon group when the selection instruction is accepted for the two or more icons;
  displaying the two or more of the icons of the selection icon group together with a non-selected icon of the icons that has not been selected as the selection icon group in the edit screen on the operation panel such that a display mode of the two or more of the icons in the edit screen is different from a display mode of the non-selected icon of the icons in the edit screen; and
  editing the two or more of the icons of the selection icon group together when the operation panel accepts the edit instruction for the selection icon group.

10. A non-transitory computer-readable storage medium storing a control program executed by a processor of a multifunction device including an operation panel that accepts instructions including an execution instruction and an edit instruction from a user and displays an operation screen and an edit screen, a scanner that reads a document, and a printer that performs printing on a medium, the control program causing the processor to execute:
  displaying, on the operation panel, the operation screen including a plurality of icons for accepting the execution instruction to execute the scanner or the printer;
  displaying, on the operation panel in a switchable manner, from the operation screen to the edit screen that displays the plurality of icons and accepts a selection instruction to select the icon from among the plurality of icons and the edit instruction to edit the icon selected by the selection instruction;
  selecting two or more of the icons as a selection icon group when the selection instruction is accepted for the two or more icons;
  displaying the two or more of the icons of the selection icon group together with a non-selected icon of the icons that has not been selected as the selection icon group in the edit screen on the operation panel such that a display mode of the two or more of the icons in the edit screen is different from a display mode of the non-selected icon of the icons in the edit screen; and
  editing the two or more of the icons of the selection icon group together when the operation panel accepts the edit instruction for the selection icon group.

* * * * *